No. 703,196. Patented June 24, 1902.
J. A. HEANY.
INSULATED WIRE.
(Application filed Feb. 14, 1901. Renewed Nov. 21, 1901.)
(No Model.)
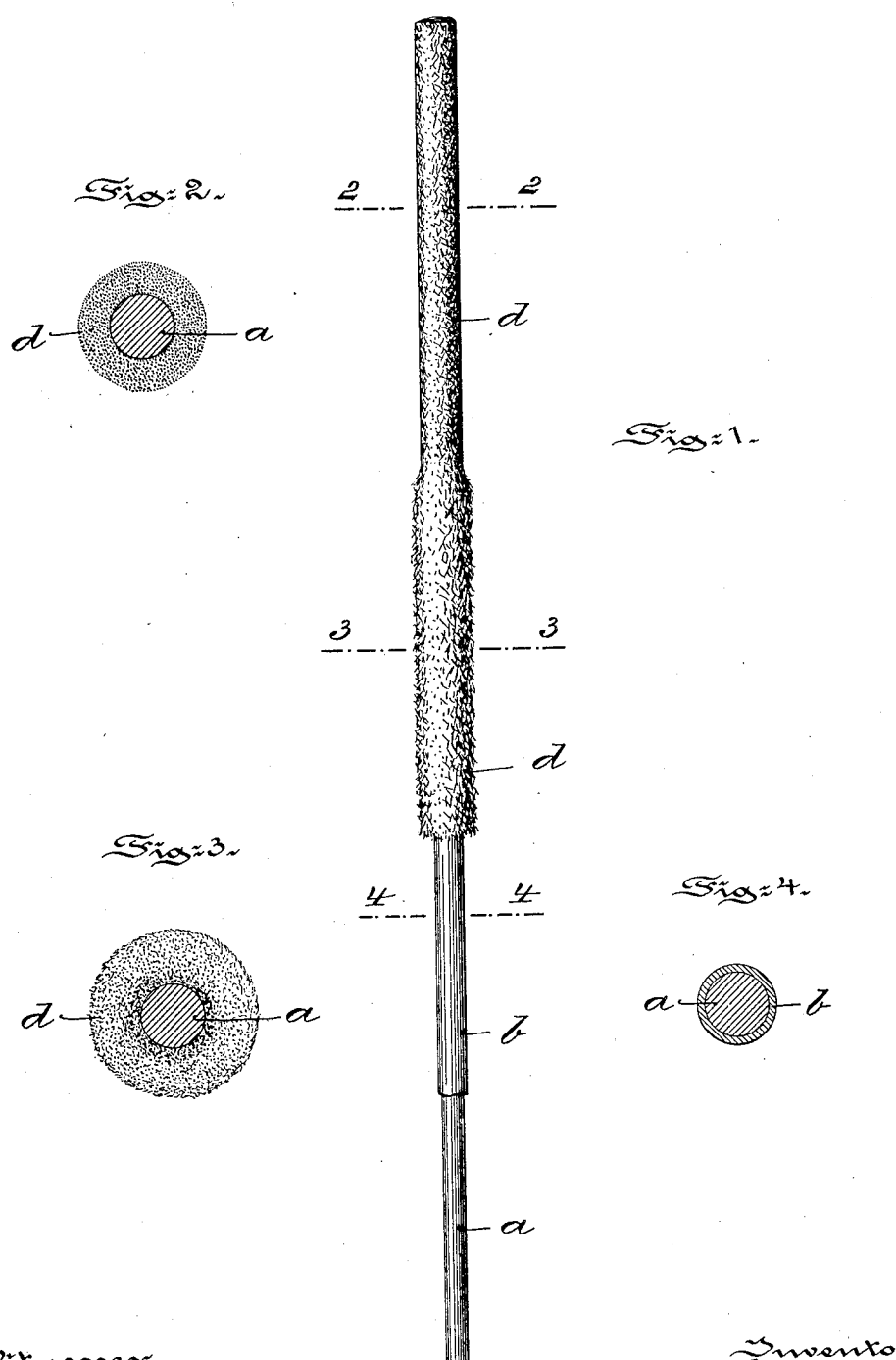

UNITED STATES PATENT OFFICE.

JOHN A. HEANY, OF PHILADELPHIA, PENNSYLVANIA, ASSIGNOR TO THE TETER-HEANY DEVELOPING COMPANY, OF PHILADELPHIA, PENNSYLVANIA, AND CHARLESTON, WEST VIRGINIA, A CORPORATION OF WEST VIRGINIA.

INSULATED WIRE.

SPECIFICATION forming part of Letters Patent No. 703,196, dated June 24, 1902.

Application filed February 14, 1901. Renewed November 21, 1901. Serial No. 83,168. (No specimens.)

*To all whom it may concern:*

Be it known that I, JOHN A. HEANY, a citizen of the United States, residing at the city of Philadelphia, in the county of Philadelphia and State of Pennsylvania, have invented certain new and useful Improvements in Insulated Wire, of which the following is a specification.

My invention has relation to a fire and water proof insulation or covering for electric wires.

The principal object of my invention is to provide a covering or insulation for electric wires which is non-combustible and water-proof—that is to say, a covering which properly insulates the wire and yet is not affected by moisture and is not destructible by heat either generated in the wire by the passage of the electric current therethrough or generated from an external source of heat.

As is well known, asbestos is a substance which is non-combustible; but from its capacity to readily absorb moisture it has hitherto been found impracticable to use the same as a covering for insulating electric wire. It has also been found difficult to cause the necessary adhesion of the asbestos to the wire, so that in the bending or twisting of the wire the asbestos will not crack or peel off.

By my present invention I have adapted for use asbestos or other non-combustible brittle substance as a covering for wire which will properly insulate the wire and will readily adhere thereto no matter how the wire may be bent and is not moisture absorbent.

The nature and scope of my invention will be more fully understood from the following description, taken in connection with the accompanying drawings, forming part thereof, in which—

Figure 1 is a top or plan view of a wire illustrating successive stages of its treatment in the embodiment of my invention; and Figs. 2, 3, and 4 are cross-sectional views of the same taken, respectively, on the lines 2 2, 3 3, and 4 4 of Fig. 1.

Referring to the drawings, $a$ represents the bare wire of any suitable metal. This wire $a$ is first drawn through a bath containing an adhesive mixture, so that its periphery will be coated or inclosed by a tubular layer of cement $b$. This adhesive mixture consists, essentially, of sodium silicate and manganese oxid in proportions sufficient to make a paste more or less viscous, and its nature is such that it readily adheres to the metallic wire $a$ and speedily hardens thereon. After the wire $a$ has been coated with the adhesive mixture or cement $b$ asbestos or similar material $d$ is dusted or blown upon the cement and projects therefrom in a furry mass, as clearly illustrated in Fig. 3. This furry covering $d$ is next subjected to pressure or to heat and pressure until the asbestos or similar material $d$ is forced into and thoroughly conglomerated with the adhesive mixture or cement $b$. The wire thus coated is then permitted to dry, and when thoroughly dried its covering of asbestos and cement will firmly cling to the wire and will not crack or peel off if the wire be twisted or bent. The mixture $b$ when thoroughly conglomerated with the asbestos $d$ forms a covering which is impervious to moisture, and the covering may be subjected to internal or external heat sufficient to melt the wire $a$ without disintegration or deterioration.

Having thus described the nature and object of my invention, what I claim as new, and desire to secure by Letters Patent, is—

1. An insulating-covering for electric wires, consisting of asbestos or similar material and an adhesive mixture, such as a silicate and an oxid, adapted to firmly unite the asbestos to the wire and to render the same impervious to moisture.

2. An insulating-covering for electric wires, consisting of a coating or covering of silicate of sodium and manganese oxid and asbestos flakes forced into the coating or covering under pressure.

3. An insulating-covering for electric wires, consisting of a coating or covering of a silicate and an oxid and asbestos forced into the coating or covering under heat and pressure.

4. An insulating-covering for electric wires, consisting of asbestos or similar material and an adhesive mixture, such as silicate of sodium and manganese oxid adapted to thoroughly conglomerate with said asbestos or similar material under heat and pressure so as to firmly cling to the wire.

In testimony whereof I have hereunto set my signature in the presence of two subscribing witnesses.

JOHN A. HEANY.

Witnesses:
J. WALTER DOUGLASS,
THOMAS M. SMITH.